US007707332B2

(12) United States Patent
Shimada

(10) Patent No.: US 7,707,332 B2
(45) Date of Patent: Apr. 27, 2010

(54) I/O-REQUEST PROCESSING SYSTEM AND METHOD

(75) Inventor: Masao Shimada, Tokyo (JP)

(73) Assignee: NEC Corporation, Tokyo (JP)

( * ) Notice: Subject to any disclaimer, the term of this patent is extended or adjusted under 35 U.S.C. 154(b) by 147 days.

(21) Appl. No.: 12/089,999

(22) PCT Filed: Oct. 12, 2006

(86) PCT No.: PCT/JP2006/320399

§ 371 (c)(1), (2), (4) Date: Apr. 11, 2008

(87) PCT Pub. No.: WO2007/043617

PCT Pub. Date: Apr. 19, 2007

(65) Prior Publication Data

US 2009/0049217 A1 Feb. 19, 2009

(30) Foreign Application Priority Data

Oct. 12, 2005 (JP) ............................ 2005-298003

(51) Int. Cl.
*G06F 3/00* (2006.01)
*G06F 12/00* (2006.01)

(52) U.S. Cl. .............................. 710/39; 710/40; 710/6; 710/244; 710/310

(58) Field of Classification Search ............. 710/36–42, 710/5–7, 1–2, 244, 310

See application file for complete search history.

(56) References Cited

U.S. PATENT DOCUMENTS

| | | | |
|---|---|---|---|
| 6,792,482 B2 * | 9/2004 | Iwatani et al. | 710/39 |
| 6,886,053 B2 * | 4/2005 | Paul | 710/38 |
| 7,216,194 B2 * | 5/2007 | Solomon et al. | 710/310 |
| 7,409,472 B2 * | 8/2008 | Iwatani et al. | 710/36 |
| 2002/0040411 A1 * | 4/2002 | Iwatani et al. | 710/2 |
| 2005/0021878 A1 * | 1/2005 | Iwatani et al. | 710/1 |
| 2007/0294450 A1 * | 12/2007 | Rudnick et al. | 710/244 |
| 2008/0098145 A1 * | 4/2008 | Yeh | 710/244 |

FOREIGN PATENT DOCUMENTS

| | | |
|---|---|---|
| JP | 64-12325 A | 1/1989 |
| JP | 2-171932 A | 7/1990 |
| JP | 6-161934 A | 6/1994 |
| JP | 6-259198 A | 9/1994 |
| JP | 9-114599 A | 5/1997 |
| JP | 2001-147824 A | 5/2001 |
| JP | 2001-184302 A | 7/2001 |

* cited by examiner

*Primary Examiner*—Christopher B Shin
(74) *Attorney, Agent, or Firm*—Sughrue Mion, PLLC

(57) ABSTRACT

An I/O-request processing system which is capable of reducing the maximum value of the time required until the I/O request of each external device is registered. An I/O-request receiving section (501) receives an I/O request issued from an external device (600). A process-information storage section (510) stores an I/O-request delay time (512) for each external device (600). A priority-process judgment section (520) registers the I/O request having a maximum I/O-request delay time (512) among the I/O requests which have been registered into an I/O-request cue (540).

12 Claims, 7 Drawing Sheets

FIG. 4

PROCESS INFORMATION

| PROCESS INFORMATION | PROCESS Px | PROCESS Py | PROCESS Pz |
|---|---|---|---|
| I/O-REQUEST-FAILURE COUNT | 2 | 4 | 6 |
| I/O-REQUEST DELAY TIME (nSec) | 400 | 200 | 100 |
| I/O-REQUEST-FAILURE TIME (nSec) | 300 | 200 | 100 |
| I/O-REQUEST-SUCCESS TIME (nSec) | 1,000,000 | 1,001,000 | 1,002,000 |
| I/O-REGISTRY-SUCCESS FLAG | 1 | 0 | 1 |
| I/O-ATTENUATION-END TIME (nSec) | 1,000,000 | 0 | 0 |
| I/O-REQUEST TIME (nSec) | 5,000 | 6,000 | 7,000 |

FIG. 5

SPECIFIED-VALUE INFORMATION

| SPECIFIED-VALUE NAME | VALUE |
|---|---|
| Tw1 | 250 (ns) |
| Tw RANK-1 | 2ND POSITION |
| Tw2 | 300 (ns) |
| Tw RANK-2 | 4TH POSITION |
| wc1 | 60 TIMES |
| Wc RANK-1 | 4TH POSITION |
| wc2 | 70 TIMES |
| WcRANK-2 | 5TH POSITION |
| RATE-1 | 50 (%) |
| RATE-2 | 60 (%) |
| RATE-3 | 70 (%) |
| Td1 | 500 (ns) |
| ATTENUATION TIME | 1,000,000 (ns) |

FIG. 6

I/O-REQUEST-CUE INFORMATION

| I/O-REQUEST-CUE INFORMATION NAME | VALUE (%) |
|---|---|
| USED RATE | 80 |
| USED NUMBER | 160 |
| REMAINING NUMBER | 40 |

FIG. 7

I/O-REQUEST INFORMATION

| I/O WRITE REQUEST | VALUE |
|---|---|
| 0=READ-OUT<br>1=WRITE-IN | 1 |
| SECTOR NUMBER | 100 |
| DATA ADDRESS | 20000 |

I/O-REQUEST PROCESSING SYSTEM AND METHOD

FIELD OF THE INVENTION

The present invention relates to I/O-request processing system and method and, more particularly, to an I/O-request processing system which receives an I/O request issued to an input/output device (data I/O device) and controls the input and output of data performed between an external device and the input/output device, and to an I/O request processing method in such an I/O-request processing system.

BACKGROUND OF THE INVENTION

An I/O-request processing system receives an I/O request issued from an external device, such as a process, delivers data from the external device to an input/output device based on the I/O request thus received, and delivers data read from the input/output device to the external device. The I/O-request processing system typically includes an I/O-request cue, consecutively registers into the cue the I/O requests issued to the same input/output device, reads out the registered I/O requests one by one, and performs I/O processing thereto.

A technique is described in Patent Publication JP-1988-180338A as a conventional technique used in a system which processes I/O requests. In this technique, tasks are managed in a priority order of start, wherein a task having a highest priority is started and the thus started task uses the I/O resource by priority. Another technique is described in Patent Publication JP-1988-39041A as a technique for performing a dispatch control onto the tasks including an I/O request. The dispatch priority of a process is controlled in this technique by using the CPU-time consumed by a process and/or the I/O processing time of the process as a parameter. For example, the dispatch priority is set at a, higher value for a process having a larger amount of I/O processing, and allows such a process to use the I/O resource by priority.

However, in each of the above conventional techniques, it is not taken into consideration which task has a higher urgency among a plurality of tasks requested to the same I/O (resource (I/O device). For this reason, a situation occurs wherein neither a task having a longer delay time of the I/O request nor the task which continues to fail in the I/O request can use the I/O resource. This may cause a problem in that a host device or higher rank process, which issues the I/O request, must have a larger number of buffers in order to prevent occurrence of a buffer overflow or underflow.

DISCLOSURE OF THE INVENTION

It is an object of the present invention to solve the problems of the above conventional techniques, and to provide an I/O-request processing system which need not have a larger amount of buffer by securing the through rate, minimizing the maximum value of the delay time of the I/O request of each external device, and preventing the overflow or underflow of the buffer in the system and/or application of a higher rank.

The present invention provides, in a first aspect thereof, an I/O-request processing system that registers an I/O request received from an external device into an I/O-request cue for controlling input/output of data performed between the external device and an input/output device based on I/O requests registered in the I/O-request cue, the I/O-request processing system including: an I/O-request receiving section that receives I/O requests issued from external devices; and a priority-external-device judgment section that refers to an external-device-information storage section storing therein a delay time elapsed after receiving the I/O request until registry thereof into the I/O-request cue, to register one of the I/O requests into the I/O-request cue, the one of the I/O requests having a higher delay time among the I/O requests received by the I/O-request receiving section.

The present invention provides, in a second aspect thereof, an I/O-request processing method for registering an I/O request received from an external device into an I/O-request cue to control input/output of data performed between the external device and an input/output device based on I/O requests registered in the I/O-request cue, the method including the steps of: receiving an I/O request issued from an external device; and referring to an external-device-information storage section storing therein a delay time elapsed after receiving the I/O request until registry thereof into the I/O-request cue, to register one of the I/O requests having a higher delay time among the received I/O requests into the I/O-request cue.

In the I/O-request processing system and method of the first and second aspects of the present invention, the I/O request issued from the external device having a largest time length between the time instant of receiving the I/O request and the present time is registered by priority into the I/O-request cue. BY employing such a configuration, the maximum delay time of the I/O requests from the external devices can be minimized, whereby the overflow or underflow of the buffer in a higher-rank system and/or application can be prevented.

The present invention provides, in a third aspect thereof, an I/O-request processing system that registers an I/O request received from an external device into an I/O-request cue for controlling input/output of data performed between the external device and an input/output device based on I/O requests registered in the I/O-request cue, the I/O-request processing system including: an I/O-request receiving section that receives an I/O request issued from an external device; and a priority-external-device judgment section that refers, upon receipt of an I/O request by the I/O-request receiving section, to an external-device-information storage section storing therein a continued-registry-failure time length for each device during which an I/O request issued from the each device is not registered in the I/O-request cue in succession and a continued-registry-failure specified-time-length storage section storing therein a specified time length for a continued-registry-failure time length, to determine whether or not the received I/O request is to be registered in the I/O-request cue.

The present invention provides, in a fourth aspect thereof, an I/O-request processing method for registering an I/O request received from an external device into an I/O-request cue for controlling input/output of data performed between the external device and an input/output device based on I/O requests registered in the I/O-request cue, the method including the steps of: receiving an I/O request issued from an external device; and referring, upon receipt of an I/O request by the I/O-request receiving section, to an external-device-information storage section storing therein a continued-registry-failure time length for each device during which an I/O request issued from the each device is not registered in the I/O-request cue in succession and a continued-registry-failure specified-time-length storage section storing therein a specified time length for a continued-registry-failure time length, to determine whether or not the received I/O request is to be registered in the I/O-request cue.

In the I/O-request processing system and method of the third and fourth aspects of the present invention, upon receiving an I/O request from an external device, it is determined whether or not the I/O request is to be registered in the I/O-request cue based on the time length during which the external device is failed in the registry of the I/O request and the specified value for the continued-registry-failure time length. In this case, the I/O request from the external device for which the registry of an I/O request is failed for a long time is registered by priority into the I/O-request cue. Thus, the maximum time length of each external device elapsed after an I/O request is issued until the registry thereof into the I/O-request cue is minimized, thereby preventing the overflow and underflow of the buffer in higher-rank system and/or application.

The present invention provides, in a fifth aspect thereof, an I/O-request processing system that registers an I/O request received from an external device into an I/O-request cue for controlling input/output of data performed between the external device and an input/output device based on I/O requests registered in the I/O-request cue, the I/O-request processing system including: an I/O-request receiving section that receives an I/O request issued from an external device; and a priority-external-device judgment section that refers, upon receipt of an I/O request by the I/O-request receiving section, to an external-device-information storage section storing therein for each external device a count of continued failure times of registry of an I/O request issued from the each device into the I/O-request cue and a continued-registry-failure-count specified-value storage section storing therein a specified value for a continued-registry-failure count, to determine whether or not the received I/O request is to be registered in the I/O-request cue.

The present invention provides, in a sixth aspect thereof, an I/O-request processing method in an I/O-request processing system that registers an I/O request received from an external device into an I/O-request cue for controlling input/output of data performed between the external device and an input/output device based on I/O requests registered in the I/O-request cue, the method including the steps of: receiving an I/O request issued from an external device; and referring to an external-device-information storage section storing therein for each external device a count of continued failure times of registry of an I/O request issued from the each device into the I/O-request cue and a continued-registry-failure-count specified-value storage section storing therein a specified value for a continued-registry-failure count, to determine whether or not the received I/O request is to be registered in the I/O-request cue.

In the I/O-request processing system and method of the fifth and sixth aspects of the present invention, if an I/O request is received from an external device, the priority-external-process judgment section determines whether or not the I/O request is to be registered in the I/O-request cue based on the number of continued failure times of the external device in the registry of the I/O request and the specified value for the continued-registry-failure count. Since the priority-external-device judgment section registers the I/O request issued from the external device having a larger continued-registry-failure count by priority, the maximum time length elapsed after an I/O request is issued until the registry of thereof into the I/O-request cue can be minimized, thereby preventing the overflow and/or underflow of the buffer in higher-rank system and application.

In the I/O-request processing system and method of the present invention, the I/O request to be registered in the I/O-request cue by priority is judged based on the registered delay time, continued-registry-failure time length or continued-registry-failure count of the I/O requests. In this way, when accessing to a low-speed input/output device, for example, such as reading therefrom or writing thereto, the maximum delay time of the I/O requests from the external devices can be minimized, thereby preventing the overflow or underflow of the buffer in higher-rank system and/or application. Thus, it is possible to reduce the buffer capacity to be provided in the external device for storing write data etc. during data writing. In addition, for the case of reading data, it is possible to reduce the read-ahead data during reproducing video data etc., to thereby reduce the buffer capacity.

BRIEF DESCRIPTION OF THE DRAWINGS

FIG. 4 is a table showing a concrete example of the information stored in the information storage section 510.

FIG. 5 is a table showing a concrete example of specified values stored in the specified-value storage section 550.

FIG. 6 is a table showing a concrete example of the information stored in the I/O-request-cue-information storage section 530.

FIG. 7 is a table showing a concrete example of the I/O request.

BEST MODE OF CARRYING OUT THE INVENTION

Figure 1:
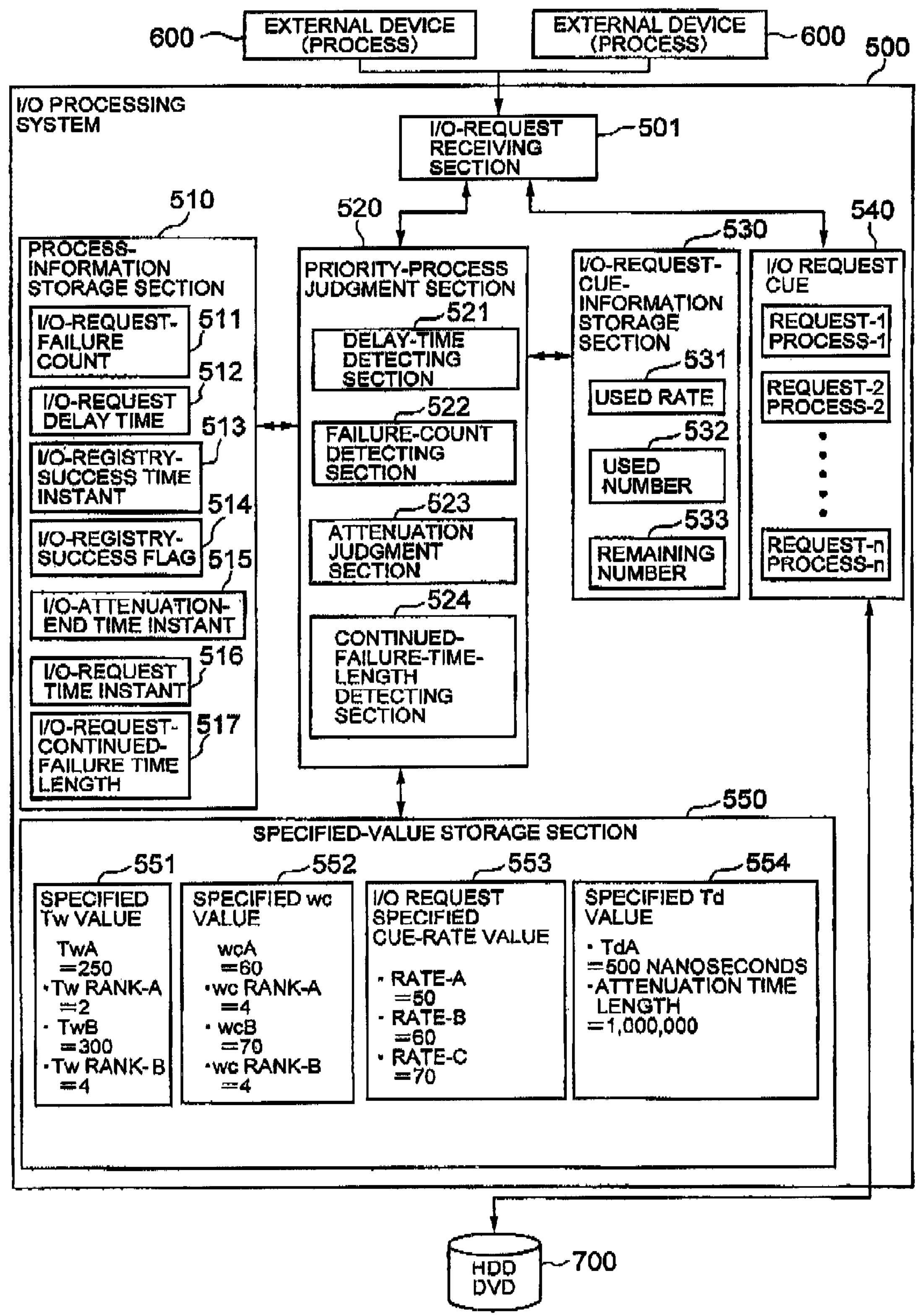
FIG. 1 is a block diagram showing the configuration of an I/O-request processing system according to an embodiment of the present invention.

Hereinafter, an embodiment of the present invention will be described in detail with reference to the drawings. FIG. 1 shows the configuration of an I/O-request processing system according to an embodiment of the present invention. The I/O-request processing system 500 includes I/O-request receiving section 501, process-information storage section 510, priority-process judgment section 520, I/O-request-cue-information storage section 530, I/O-request cue 540, and specified-value storage section 550. The I/O-request processing system 500 receives I/O requests that external devices (processes) 600 have issued to an input/output device 700, for example, data storage device 700 such as DVD (digital versatile disk) and hard disk (HDD), registers the I/O request into the I/O-request cue 540, and consecutively delivers the I/O requests stored in the I/O-request cue 540 to the input/output device 700. The I/O-request processing system 500, if it fails in the registry of an I/O request into the I/O-request cue 540, returns information of the failure to the process which issued the I/O request. In an alternative, the I/O-request processing system 500 iteratively perform the registry operation, until the registry into the I/O-request cue 540 is succeeded.

The I/O-request receiving section 501 receives from a process 600 an I/O request that shows a writing or reading request. The priority-process judgment section 520 judges the priority process by using an algorithm, and stores the I/O request from the process into the I/O-request cue 540. The process-information storage section 510 stores therein specific process information of each process 600. More specifically, the process-information storage section 510 stores therein an I/O-request-failure account 511 that shows the number of failures in the I/O request, an I/O-request delay time 512 that shows a time length elapsed from the receipt of the I/O request until the success of the registry into the I/O-request cue 540, an I/O-registry-success time instant 513 that shows the time instant at which the I/O request succeeded registry thereof into the I/O-request cue 540, an I/O-registry-success flag 514 that shows a successful registry of the I/O request into the I/O-request cue 540, an I/O-attenuation-end time instant 515 that shows the time instant at which lowering of the priority of registry of the I/O request is ended, an I/O-request time instant 516 at which the I/O request is issued, and an I/O-request-failure time length 517 that shows the time length of the continued failure in registry of the I/O request into the I/O-request cue 540.

The I/O-request cue 540 is configured by a cue storing therein one or a plurality of I/O requests and connected in a list structure. The I/O-request-cue-information storage section 530 stores therein information relating to the status of usage of the I/O-request cue 540. More specifically, the I/O-request-cue-information storage section 530 stores therein a used rate 531 that shows the ratio of an area in which the I/O requests are registered to an area in which the I/O requests can be registered, a used number 532 that shows the number of I/O requests registered in the I/O-request cue 540, and a remaining number 533 that shows the number of remaining I/O requests which can be registered. The specified-value storage section 550 stores therein specified values used when the priority-process judgment section 520 judges a priority process. More specifically, the specified-value storage section 550 stores therein a specified Tw value 551 used for comparison of the delay time of the I/O requests or comparison of the continued failure time length of the I/O requests, a specified wc value 552 used for comparison of the continued-failure count of the I/O requests, a specified I/O-request-cue-rate value 553 used for comparison of the used rate of the I/O requests, and a specified Td value 554 used for comparison of the time interval during which an I/O request is not received from the same process.

The priority-process judgment section 520 includes a delay-time detecting section 521, a failure-count detecting section 522, an attenuation judgment section 523, and a continued-failure-time-length detecting section 524. The delay-time detecting section 521 compares the delay time from the receipt of an I/O request until the registry of the I/O request into the I/O-request cue 540. The failure-count detecting section 522 compares the number of times of failure in the registry of an I/O request into the I/O-request cue 540. The attenuation judgment section 523 judges the time instant at which the registry priority of the I/O request from a process is to be lowered. The continued-failure-time-length detecting section 524 compares the time length during which an I/O request failed in the registry thereof in succession into the I/O-request cue 540.

Figure 2:
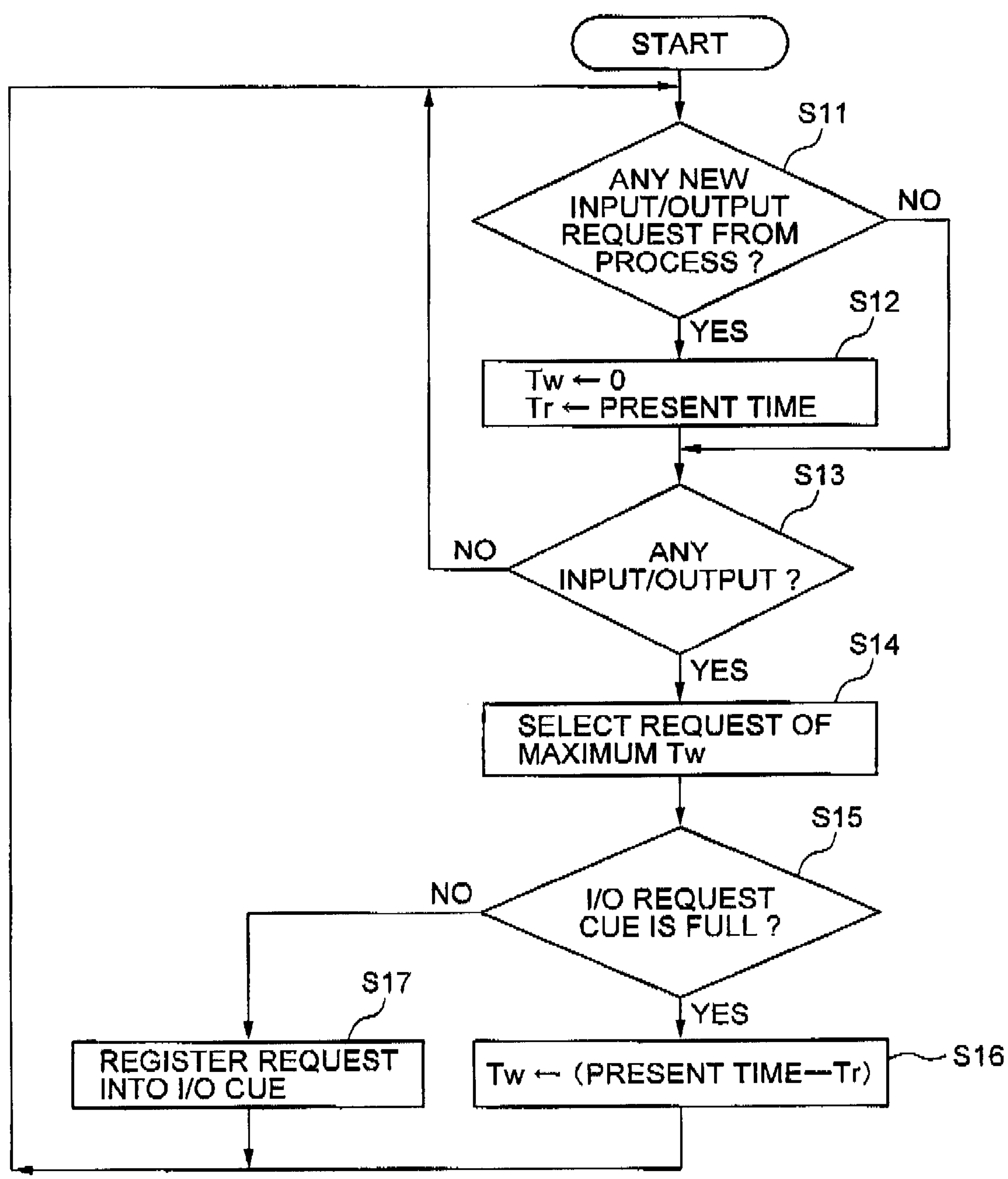
FIG. 2 is a flowchart showing a first procedure of the I/O-request processing system 500.

Hereinafter, a processing after the I/O-request processing system 500 receives an I/O request until the registry thereof into the I/O-request cue 540 will be described. FIG. 2 shows an operation procedure of the I/O-request processing system 500 when an I/O request having a long delay time is registered in the I/O-request cue 540 by priority. In this example, the I/O-request processing system 500 repeats a registry processing until the I/O request is registered in the I/O-request cue 540, and blocks the processing of a process 600 that has issued the I/O request, until the I/O request is registered in the I/O-request cue 540.

Firstly, the priority-process judgment section 520 judges whether or not the I/O-request receiving section 501 has received a new I/O request from a process 600 (step S11). The priority-process judgment section 520 sets, upon receipt of the new I/O request, the I/O-request delay time (Tw) 512 at zero with respect to that process 600, and also sets the I/O-request time instant (Tr) 516 at the present time (step S12). Nanosecond or clock number of the central processing unit may be used as the unit for counting the time instant. Thereafter, it is judged whether or not there remains an I/O request to be registered in the I/O-request cue 540 (step S13). If all the I/O requests received therein are registered in the I/O-request cue 540, the process returns to step S11.

If there is a remaining I/O request that has not been registered in the I/O-request cue 540 among the received I/O requests, the delay-time detecting section 521 compares the I/O request delay times (Tw) 512 of the processes against one another, and selects one of them having a longest delay time (step S14). Thereafter, it is judged with reference to the I/O-request-cue-information storage section 530 whether or not the I/O-request cue 540 is full, that is, whether or not the remaining number 533 is zero. If the I/O-request cue 540 is full, the I/O-request delay time (Tw) 512 of all the received I/O requests with respect to the issuing process 600 are set at a time instant obtained by subtracting the I/O-request time instant (Tr) 516 from the present time (step S16), and the process returns to step S11.

If there is a remaining area in the I/O-request cue 540 for allowing registry of an I/O request, the I/O request selected in step S14 is registered in the I/O-request cue 540 (step S17). The priority-process judgment section 520 sets the I/O-request delay time (Tw) 512 of the process corresponding to the I/O request which was not registered in step S17 at a time length obtained by subtracting the I/O-request time instant (Tr) 516 from the present time. Then, the process returns to step S11, where the registry processing of I/O requests are continued. By performing the above process, an I/O request from the process 600 for which the registry of I/O request is failed for a longer time can be registered in the I/O-request cue 540 by priority, whereby the time period during which the processing in the process 600 is blocked can be reduced.

Figure 3:
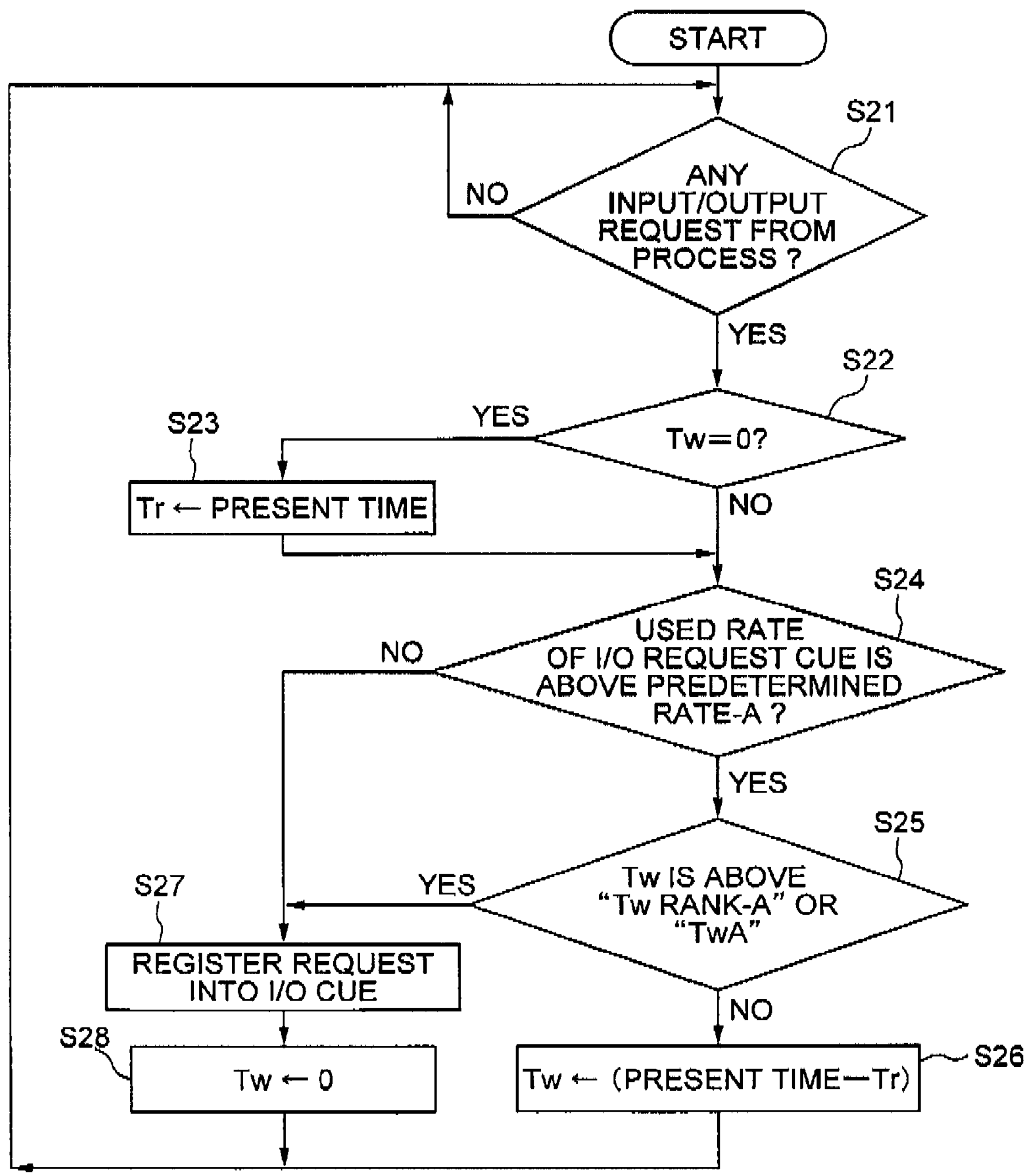
FIG. 3 is a flowchart showing a second procedure of the I/O-request processing system 500.

FIG. 3 shows an operation procedure of the I/O-request processing system 500 during registering, into the I/O-request cue 540 by priority, the request from the process for which the registry of I/O request is failed for a long time. In the following example, the I/O-request processing system 500, if it fails in the registry into the I/O-request cue 540, returns the information thereof to the process 600 which issued the request. Each process 600, upon receiving from the I/O-request processing system 500, a notification that the I/O request is failed, waits for a predetermined time length before the each process resends the I/O request.

The priority-process judgment section 520 judges whether or not the I/O-request receiving section 501 has received an I/O request from a process (step S21). If the I/O request has not been received, the process returns to step S21 until an I/O request is received. The priority-process judgment section 520, upon judging that the I/O-request receiving section 501 has received an I/O request, judges whether or not the I/O-request-continued-failure time length (Tw) 517 of the process 600 corresponding to the received I/O request is zero (step S22). The fact that the I/O-request-continued-failure time length (Tw) 517 is zero means that the I/O request is received for the first time, whereby the priority-process judgment section 520 sets the I/O-request time instant (Tr) 516 corresponding to the process 600 at the present time (step S23).

The priority-process judgment section 520 judges whether or not the used rate 531 is more than the predetermined rate-A designated by an I/O-request-cue-factor specified value 553 as a threshold, with reference to the I/O-request-cue-information storage section 530 and specified-value storage section 550 (step S24). If it is judged that the used rate 531 is smaller than the predetermined rate-A in step S24, the received I/O request is registered in the I/O-request cue 540 (step S27), and sets the I/O-request-continued-failure time length (Tw) 517 at zero (step S28), and the process returns to step S21.

The priority-process judgment section 520, upon judging that the used rate 531 is more than the predetermined rate-A in step S24, judges in the continued-failure-time-length detecting section 524 whether the I/O-request-continued-failure time length of the process 600 corresponding to the received I/O request is more than the time length "TwA" which is designated by the specified Tw value 551 (step S25). In an alternative, when the I/O-request-continued-failure time lengths (Tw) 517 of the processes 600 are sorted in a descending order, it is judged whether or not the rank of the I/O-request-continued-failure time length (Tw) 517 of the process 600 corresponding to the received I/O request is more than the "Tw rank-A" designated by the specified Tw value 551.

The priority-process judgment section 520, if it judges that the result of judgment is more than "TwA" or higher than "Tw rank-A", advances to step S27 to register the I/O request into the I/O-request cue 540. On the other hand, the priority-process judgment section 520, if it judges that the result of judgment is smaller than "TwA" or lower than "Tw rank-A", sets the I/O-request-continued-failure time length (Tw) 517 at a value obtained by subtracting the I/O-request time instant (Tr) 516 from the present time (step S26). Then, the priority-process judgment section 520 returns, to the process 600 that issued the I/O request, the information that the registry into the I/O-request cue is failed, and the process returns to step S21.

Now, a case where three processes Px, Py and Pz each issued an I/O request will be described as an example. It is assumed here that the process-information storage section 510 stores therein the information shown in FIG. 4 for each of the processes. It is also assumed that the specified-value storage section 550 stores the specified values shown in FIG. 5, and that the I/O-request-cue-information storage section 530 stores the information shown in FIG. 6. In this situation, if the I/O-request receiving section 501 receives an I/O write request such as shown in FIG. 7 from process Px in step S21, the process advances to step S23 from step S22, because the I/O-request-continued-failure time length (Tw) 517 of process Px is not zero.

In step S24, since used rate 531, "80%", of the I/O-request cue 540 is more than the predetermined rate-A, "50%", of the specified I/O-request-cue-rate value 553 in the specified-value storage section 550, the process advances to step S25. In step S25, upon comparing the I/O-request-continued-failure time length 517 (Tw: 300 ns) of process Px against the time length TwA, "250 ns", designated by the specified Tw value 551, it is judged that the I/O-request-continued-failure time length (Tw) 517 of process Px is larger. Thus, the process advances to step S27 where the I/O request of process Px is registered in the I/O-request cue 540. Thereafter, the I/O-request-continued-failure time length (Tw) 517 of process Px is reset by zero in step S28.

In the above situation, if the I/O-request receiving section 501 has received the I/O request from process Py in step S21, the process consecutively advances to steps S23, S24, and S25 from step S22 similarly to the above process. The I/O-request-continued-failure time length 517 (Tw: 200 ns) of process Py is smaller than the time length TwA, "250 ns", designated by the specified Tw value 551. However, upon comparing the rank of process Py in the descending order of the delay time of the I/O-request-continued-failure time lengths 517 against the rank, second position, of the "Tw rank-A" designated by the specified Tw value 551, it is judged that the rank, "second position", of the I/O-request-continued-failure time length (Tw) 517 of process Py is not lower than the "Tw rank-A", "second position". Thus, the process advances from step S25 to step S27, where the I/O request of process Py is registered in the I/O-request cue 540.

If the I/O-request receiving section 501 has received an I/O request from process Pz in step S21, in the above situation, the I/O-request-continued-failure time length is compared, whereby it is judged that the I/O-request-continued-failure time length 517 (Tw: 100 ns) of process Pz is smaller than the time length TwA, "250 ns", designated by the specified Tw value 551. The rank, "third position", of process Pz in the descending order of the I/O-request-continued-failure time lengths 517 is lower than the Tw rank-A, "second position". Thus, the process advances from step S25 to step S26, where the I/O request of process Pz is not registered in the I/O-request cue 540.

If a scheme is employed wherein the I/O requests are registered in the order of starting priority, as in the case of the conventional I/O request processing system, the time length during which the registry of an I/O request is failed is not taken into consideration. In this case, if the starting priority of process Pz is the highest, the I/O request issued by process Pz is first registered into the cue, whereby the I/O requests issued by processes Px and Py for which the registry of an I/O request has failed for a longer time loses the opportunity for the registry thereof. By adopting the configuration wherein an I/O request is registered in the I/O-request cue 540 according to the procedure shown in FIG. 3, the I/O request from a process 600 for which the registry of an I/O request is failed for a longer time can be registered in the I/O-request cue 540 by priority. Thus, the maximum delay time elapsed after each process 600 generates an I/O request until the registry of thereof into the I/O-request cue 540 can be minimized.

Figure 8:
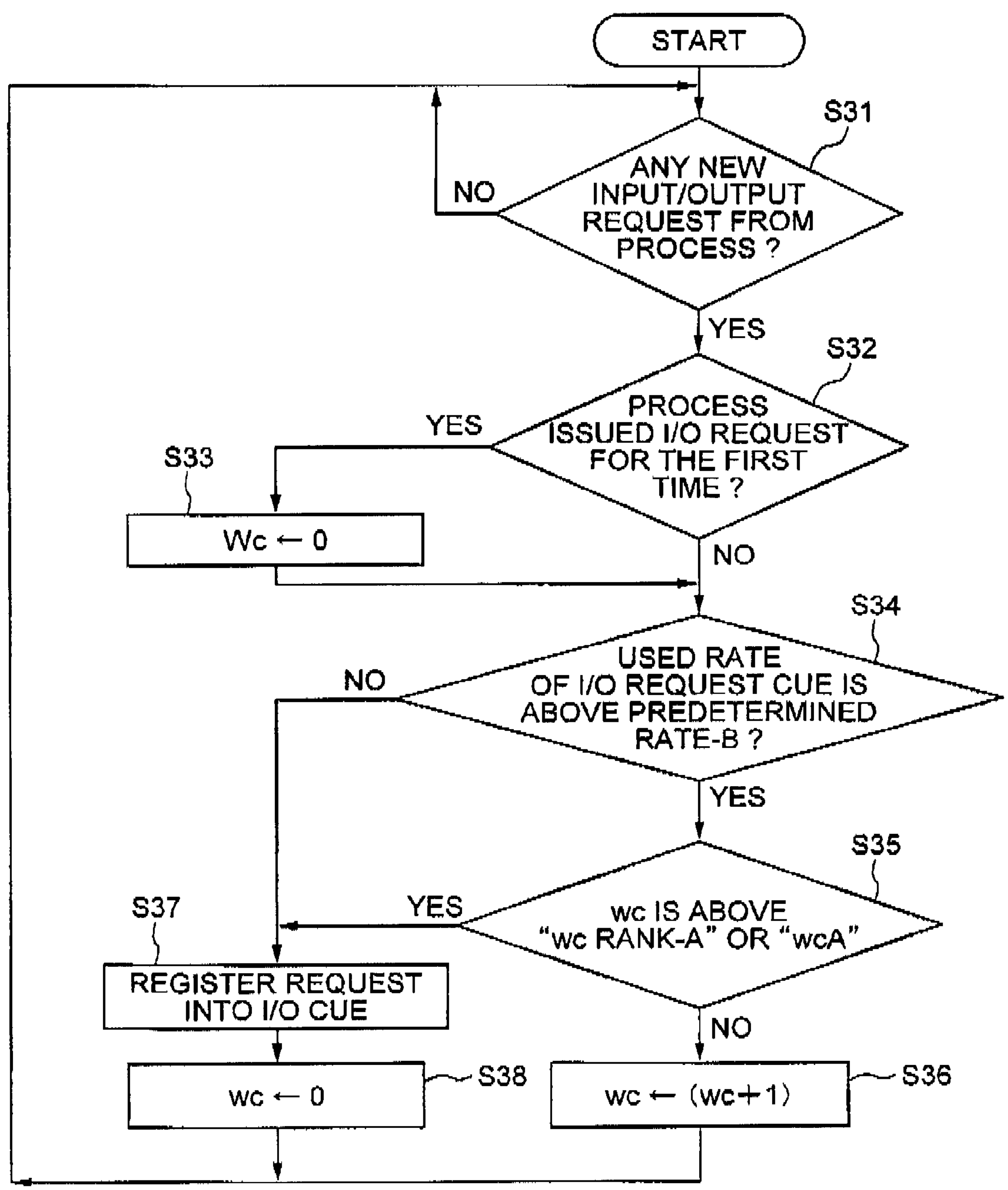
FIG. 8 is a flowchart showing a third procedure of the I/O-request processing system 500.

FIG. 8 shows a procedure of the I/O-request processing system 500 during registry of the I/O requests into the I/O-request cue 540 such that the I/O request issued from a process 600 for which the registry of the I/O request is failed for a larger number of times is registered by priority. The priority-process judgment section 520 judges whether or not the I/O-request receiving section 501 has received a new I/O request from a process 600 (step S31). If a new I/O request is not received, the process returns to step S21, where the priority-process judgment section 520 awaits until a new I/O request is received. The priority-process judgment section 520, if it judges that the I/O-request receiving section 501 has received a new I/O request, judges whether or not the process 600 corresponding to the received I/O request is a process that issued the I/O request for the first time (step S32). If it is judged that the process 600 is one that issued the I/O request for the first time, the I/O-request-failure count (wc) 511 of the process is set at zero (step S33).

The priority-process judgment section 520 judges whether or not the used rate 531 is more than a predetermined rate-B, which is designated by the specified I/O-request-cue-rate value 553 as a threshold, with reference to the I/O-request-cue-information storage section 530 and specified-value storage section 550 (step S34). For example, if the specified-value storage section 550 stores the information shown in FIG. 5, the priority-process judgment section 520 acquires the value (60%) corresponding to the predetermined rate-B from the specified-value storage section 550, and judges whether or not the used rate 531 is equal to or above the value (60%). If it is judged in step S24 that the used rate 531 is smaller than the predetermined rate-B, the received I/O request is registered in the I/O-request cue 540 (step S37), the I/O-request-failure count (wc) 511 is set at zero (step S38), and the process returns to step S31.

If the priority-process judgment section 520, if it judges that the used rate 531 is more than the predetermined rate-B in step S34, judges in the failure-count detecting section 522 whether or not the I/O-request-failure count 511 of the process 600 corresponding to the received I/O-request is more than the failure count "wcA" designated by the specified wc value 552 (step S35). In alternative, when the I/O-request-failure counts of the processes 60 are sorted in a descending order thereof it is judged whether or not the rank of the I/O-request-failure count of the process 600 corresponding to the received I/O request is larger than the failure count, "wcA", designated by the specified wc value. For example, if the specified-value storage section 550 stores the information shown in FIG. 5, the priority-process judgment section 520 judges whether or not the I/O-request-failure count (wc) 511 is more than the failure count, "wcA" (60 times), or whether or not the rank of the I/O-request-failure count (wc) 511 is higher than the "wc rank-A" (fourth position).

If "more than "wcA"" or "higher than "wc rank-A"" is judged in step S35, the process advances to step S37, where the I/O request is registered in the I/O-request cue 540. On the other hand, if "smaller than "wcA"" or "lower than "wc rank-A"" is judged, the I/O-request-failure count (wc) 511 is added by one (step S36), and the information that the registry of I/O request into the I/O-request cue 540 is failed is returned to the process that issued the I/O request, whereby the process returns to step S31. By registering the I/O request into the I/O-request cue 540 in such a procedure, the I/O request issued from a process for which the registry of the I/O request is failed for a larger number of times can be registered in the I/O-request cue 540 by priority, and as a result, the maximum I/O-request delay time for the processes 600 can be minimized.

Figure 9:
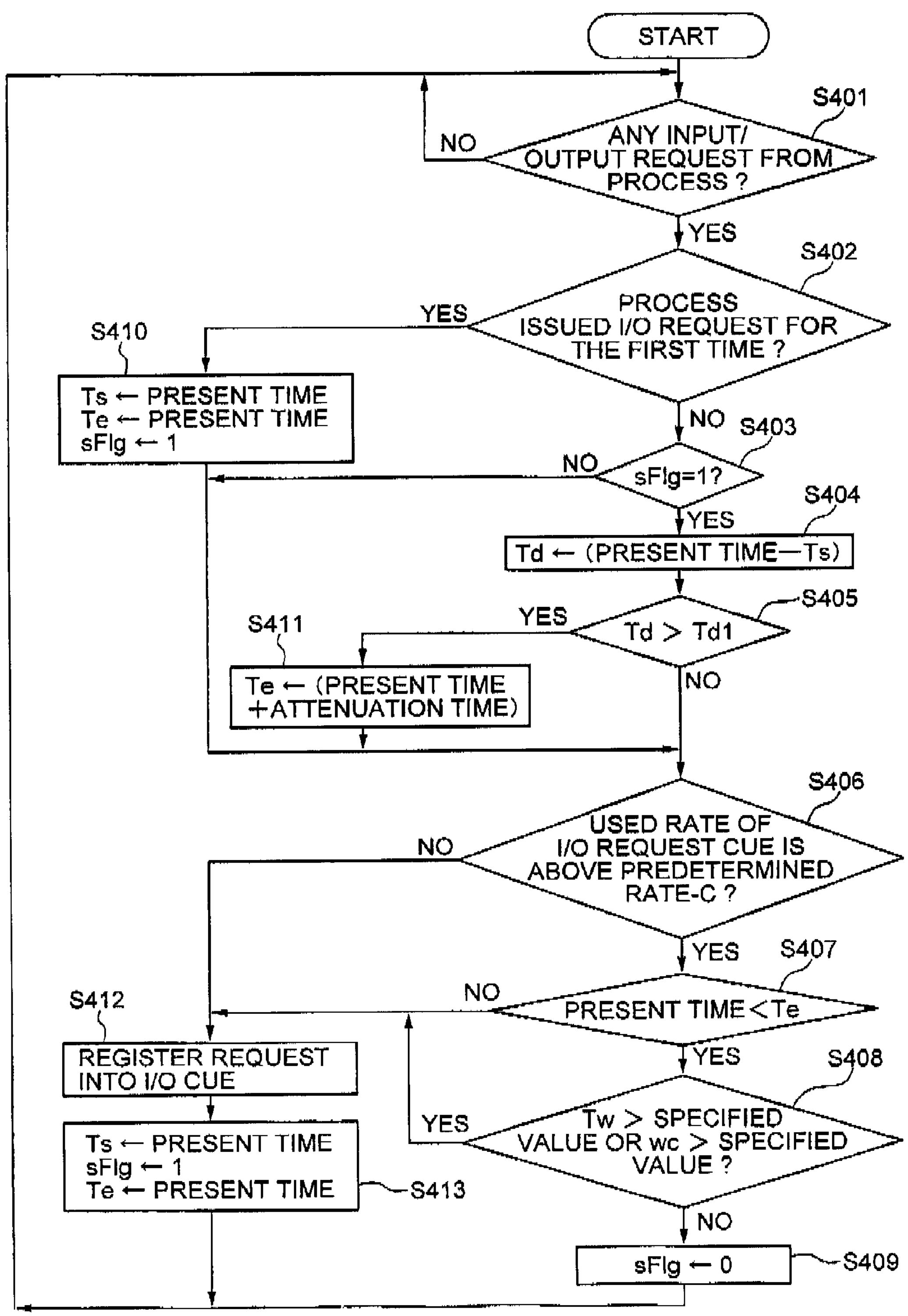
FIG. 9 is a flowchart showing a fourth procedure of the I/O-request processing system 500.

FIG. 9 shows an operation procedure of the I/O-request processing system 500 wherein an I/O request from a process 600 that has not issued an I/O request for a long time is suppressed for the registry thereof into the I/O-request cue 540 for a while. The priority-process judgment section 520 judges whether or not the I/O-request receiving section 501 has received an I/O request from a process 600 (step S401). If an I/O request is not received, the process returns to step S401, where the priority-process judgment section 520 awaits until an I/O request is received.

The priority-process judgment section 520, if it judges that the I/O-request receiving section 501 has received an I/O request, judges whether or not the process 600 corresponding to the received I/O request is one that issued the I/O request for the first time (step S402). If the process issued the I/O request for the first time, the priority-process judgment section 520 sets the I/O-registry-success time instant (Ts) 513 and I/O-attenuation-end time instant (Te) 515 at the present time, sets the I/O-registry-success flag (sFlg) 514 at "1" that means a success (step S410), and the process advances to step S406.

If the priority-process judgment section 520 judges in step S402 that the process is not one that issued the I/O request for the first time, the priority-process judgment section 520 judges whether or not the I/O-registry-success flag (sFlg) 514 shows a success, "1" (step S403). If the I/O-registry-success flag (sFlg) 514 does not show the success, "1", the process advances to step S406. If the I/O-registry-success flag (sFlg) 514 shows a success, "1", the priority-process judgment section 520 subtracts from the present time a time instant Ts at which the registry of the I/O request is succeeded, to calculate a time length Td during which an I/O request is not issued from the process 600 (step S404).

The priority-process judgment section 520 judges with reference to the specified Td value 554 whether or not the time length Td calculated in step S404 is larger than the specified value, "TdA" (step S405). For example, if the specified-value storage section 550 stores the information shown in FIG. 5, the priority-process judgment section 520 acquires a specified value, "TdA" (500 ns), from the specified-value storage section 550, and judges whether or not the calculated Td is larger than 500 ns. If the time length Td during which an I/O request is not issued is larger than the specified value, "TdA", the priority-process judgment section 520 sets the time instant obtained by adding the attenuation time length designated by the specified Td value 554 to the present time as the I/O-attenuation-end time instant (Te) 515 (step S411). For example, if the specified-value storage section 550 stores the information shown in FIG. 5, the time instant obtained by adding the attenuation time length (1,000,000 ns) designated by the specified-value storage section 550 to the present time is set as the I/O-attenuation-end time instant (Te) 515. If the time length Td during which an I/O request is not issued is below the specified value, "TdA", the process advances to step S406 without any processing.

The priority-process judgment section 520 judges with reference to the I/O-request-cue-information storage section 530 and specified-value storage section 550 whether or not the used rate 531 is larger than the predetermined rate-C designated by the specified I/O-request-cue-rate value 553 as a threshold (step S406). For example, if the specified-value storage section 550 stores the information shown in FIG. 5, the priority-process judgment section 520 acquires the value (70%) corresponding to the predetermined rate-C from the specified-value storage section 550, and judges whether or not the used rate 531 is equal to or larger than the value (70%). If it is judged in step S406 that the used rate 531 is smaller than the predetermined rate-C, the received I/O request is registered in the I/O-request cue 540 (step S412). The I/O-registry-success time instant (Ts) 513 and I/O-attenuation-end time instant (Te) 515 are set at the present time, the I/O-registry-success flag (sFlg) 514 is set at a success, "1" (step S413), and the process returns to step S401.

The priority-process judgment section 520, if it judges in step S406 that the used rate 531 is larger than the predetermined rate-C, compares in the attenuation judgment section 523 the present time against the I/O-attenuation-end time instant (Te) 515, and judges whether or not the present time is prior to the I/O-attenuation-end time instant (Te) 515 (step S407). If it is judged that the present time is not prior to the I/O-attenuation-end time instant (Te) 515, that is, the present time is behind the I/O-attenuation-end time instant (Te) 515, the process advances to step S412 where the I/O request is registered in the I/O-request cue 540.

The priority-process judgment section 520, if it judges in step S407 that the present time is prior to the I/O-attenuation-end time instant (Te) 515, judges whether or not the I/O-request-continued-failure time length (Tw) 517 measured in a procedure similar to that shown in FIG. 3 exceeds the specified value designated by the specified-value storage section 550 (step S408). In an alternative, the priority-process judgment section 520 judges whether or not the I/O-request-failure count (wc) 511 counted in a procedure similar to that shown in FIG. 8 exceeds the specified value (or is equal to or larger than the specified value) designated by the specified-value storage section 550.

In step S408, it is judged with reference to the specified-value storage section 550 (FIG. 5), for example, whether the I/O-request-continued-failure time length (Tw) 517 is equal to or larger than the delay time, "TwB" (300 ns), or whether or not the rank of the I/O-request-continued-failure time length (Tw) 517 is equal to or higher than the "Tw rank-B" (fourth position). In an alternative, it is judged whether or not the I/O-request-failure count (wc) 511 is equal to or more than the failure count "wcB" (70 times) or whether or not the rank of the I/O-request-failure count 511 is equal to or higher than the "wc rank-B" (fifth position).

The priority-process judgment section 520, if it judges in step S408 "excess of the specified value", advances to step S41, to register the I/O request into the I/O-request cue 540. If it is judged in step S408 that the specified value is not exceeded, the priority-process judgment section 520 sets the I/O-registry-success flag (sFlg) 514 at "0" (failure) (step S409), and the process returns to step S401. By registering the I/O request into the I/O-request cue 540 in such a procedure, the priority of an I/O request issued from the process 600 that has not transmitted an I/O request for a long time is reduced for the registry thereof until the I/O-attenuation-end time instant 515, whereby an I/O request from another process 600 can be registered in the I/O-request cue 540 by priority.

In the present embodiment, in the state of a higher used rate of the I/O-request cue 540, i.e., the state of a smaller remaining number to be allowed for registry, an I/O request from a process 600 for which the I/O-request delay time 512 or I/O-request-continued-failure time length 517 is long is registered by priority into the I/O-request cue 540 by the priority-process judgment section 520. In an alternative, an I/O request from a process 600 having a higher I/O-request-failure count 511 is registered in the I/O-request cue 540 by priority. In this way, it is possible to considerably reduce the delay time of an access to, such as reading from or writing to, a low-speed device for example, whereby it is possible to reduce the buffer capacity for storing write data in a higher-rank application or device that transmits an I/O request to the I/O-request processing system 500. In addition, for the case of reading data, it is possible to reduce the read-ahead data during reproducing video data etc., to thereby reduce the buffer capacity.

The processings of registry into the I/O-request cue 540, as described in the above embodiments, may be used in a combination thereof. For example, the priority-process judgment section 520 may perform the processing of the registry into the I/O-request cue 540 at the beginning based on the procedure shown in FIG. 3, and thereafter performs the registry into the I/O-request cue 540 based on the I/O-request-failure count 511 according to the procedure shown in FIG. 4. In addition, the I/O request may be registered in the procedure shown in FIG. 3 as to a specific memory unit, and the I/O request may be registered in the procedure shown in FIG. 4 as to another memory unit. Although the judgment is performed as to whether or not the I/O-request delay time 512 is not lower than the specified value in the step S25 etc., the judgment may be performed as to whether or not the I/O-request delay time exceeds the specified value. Although the judgment is performed as to whether or not the used rate 531 is equal to or larger than the specified value in step S24 etc., the used rate may be replaced by a used number 532 or a remaining number 533, whereby the judgment may be performed as to whether or not the used number 532 is smaller than the specified value or whether or not the remaining number 533 is equal to or larger than the specified value number.

As described heretofore, the present invention may employ the following embodiments. In the third aspect of the present invention, a configuration my be employed wherein the continued-registry-failure specified-time-length storage section stores therein a threshold of the continued-registry-failure time length, and the priority-external-device judgment section registers the received I/O request into the I/O-request cue if the continued-registry-failure time length of the external device that issued the I/O request is equal to or larger than the threshold. In the fourth aspect of the present invention, a configuration may be employed wherein the continued-registry-failure-count specified-value storage section stores therein a threshold of the continued-registry-failure count, and the priority-external-device judgment section registers the received I/O request into the I/O-request cue if the continued-registry-failure count of the external device that issued the received I/O request is equal to or larger than the threshold of the continued-registry-failure count. If a threshold for the continued-registry-failure time length is used as the specified value, the I/O request issued from an external device having a continued-registry-failure time length which is equal to or above the threshold may be registered in the I/O-request cue by priority, to minimize the maximum time length needed until the I/O request is registered in the I/O-request cue.

In the I/O-request processing system of the third aspect of the present invention, a configuration may be employed wherein the continued-registry-failure specified-time-length storage section stores therein a threshold of rank of the continued-registry-failure time length, and the priority-external-device judgment section registers the received I/O request into the I/O-request cue, if a rank of the external device that issued the I/O request is equal to or higher than the threshold of the rank of continued-registry-failure time length when the continued-registry-failure time lengths of the external devices are arranged in a descending order thereof. In the I/O-request processing method of the fourth aspect of the present invention, a configuration may be employed wherein the continued-registry-failure specified-time-length storage section stores therein a threshold of rank of the continued-registry-failure time length, and the step of determining whether or not to be registered registers the received I/O request into the I/O-request cue, if a rank of the external device that issued the I/O request is equal to or higher than the threshold of the rank of continued-registry-failure time length when the continued-registry-failure time lengths of the external devices are arranged in a descending order thereof. If a threshold for the rank of the continued-registry-failure time length is used as the specified value when the continued-registry-failure time lengths are arranged in a descending order thereof, the I/O request issued from an external device having a rank of continued-registry-failure time length which is equal to or above the threshold may be registered in the I/O-request cue by priority, to minimize the maximum time length needed until the I/O request is registered in the I/O-request cue.

In the I/O-request processing system of the fifth aspect of the present invention, a configuration may be employed wherein the continued-registry-failure-count specified-value storage section stores therein a threshold of the continued-registry-failure count, and the priority-external-device judgment section registers the received I/O request into the I/O-request cue if the continued-registry-failure count of the external device that issued the received I/O request is equal to or larger than the threshold of the continued-registry-failure count. In the I/O request processing method of the sixth aspect of the present invention, a configuration may be employed wherein the continued-registry-failure-count specified-value storage section stores therein a threshold of the continued-registry-failure count, and the step of determining whether or not to be registered registers the received I/O request into the I/O-request cue if the continued-registry-failure count of the external device that issued the received I/O request is equal to or larger than the threshold of the continued-registry-failure count. If a threshold for the continued-registry-failure count is used as the specified value, the I/O request issued from an external device having a continued-registry-failure count which is equal to or higher than the threshold may be registered in the I/O-request cue by priority, to minimize the maximum time length needed until the I/O request is registered in the I/O-request cue.

In the I/O-request processing system of the fifth aspect of the present invention, a configuration may be employed wherein the continued-registry-failure-count specified-value storage section stores therein a threshold of rank of the continued-registry-failure count, and the priority-external-device judgment section registers the received I/O request into the I/O-request cue, if a rank of the external device that issued the received I/O request is equal to or above the threshold of the rank of continued-registry-failure count when the continued-registry-failure counts of the external devices are arranged in a descending order thereof. In the I/O-request processing method of the sixth aspect of the present invention, a configuration may be employed wherein the continued-registry-failure-count specified-value storage section stores therein a threshold of rank of the continued-registry-failure count, and the step of determining whether or not to be registered registers the received I/O request into the I/O-request cue, if a rank of the external device that issued the received I/O request is equal to or above the threshold of the rank of continued-registry-failure count when the continued-registry-failure counts of the external devices are arranged in a descending order thereof. If a threshold for the rank of the continued-registry-failure count is used as the specified value, the I/O request issued from an external device having a rank of continued-registry-failure count which is equal to or higher than the threshold may be registered in the I/O-request cue by priority, to minimize the maximum time length needed until the I/O request is registered in the I/O-request cue.

In the I/O-request processing system of the third and fifth aspects of the present invention, a configuration may be employed wherein the I/O-request processing system returns information to the external device that issued the received I/O request, the information indicating a failure of the registry into the I/O-request cue, if the priority-external-device judgment section judges that the received I/O request is not registered into the I/O-request cue. In the I/O-request processing method of the fourth and sixth aspects of the present invention, a configuration may be employed wherein the method further includes the step of returning information to the external device that issued the received I/O request, the information indicating a failure of the registry into the I/O-request cue, if the step of determining whether or not to be registered judges that the received I/O request is not registered into the I/O-request cue. In this case, the external device which is notified of the failure may wait for a predetermined time length before resending the I/O request.

In the I/O-request processing system of the third and fifth aspect of the present invention, a configuration may be employed wherein the priority-external-device judgment section refers to an I/O-request-cue-information storage section that stores therein a used rate of the I/O-request cue and an I/O-request-cue specified-value storage section that stores therein a specified value for the used rate, to determine that the received I/O request be registered in the I/O-request cue if the used rate is smaller than the specified value. In the I/O request processing method of the second and third aspects of the present invention, a configuration may be employed wherein the method further includes the steps of: referring to an I/O-request-cue-information storage section that stores therein a used rate of the I/O-request cue and an I/O-request-cue specified-value storage section that stores therein a specified value for the used rate, to compare the used rate against the specified value for the used rate; and registering the received I/O request into the I/O-request cue if the used rate is smaller than the specified value. If the used rate is low, there is a margin for the space of the I/O-request cue. In this situation, the I/O request is registered in the I/O-request cue without performing judgment as to approval or disapproval of registry of the I/O request based on the specified value.

In the I/O-request processing system of the third and fifth aspect of the present invention, a configuration may be employed wherein the system further includes an attenuation-time-instant setting section that compares a time interval of receiving the I/O requests from the external device against a threshold of the time interval stored in a time-interval specified-value storage section, to stores in association with the external device an attenuation-end time instant, at which a registry priority of the I/O request issued from the external device is lowered if it is judged that the time interval of receiving the I/O requests exceeds the threshold of the time interval. In this case, a configuration may be employed wherein the priority-external-device judgment section compares the present time against the attenuation-end time instant, to determine that the received I/O request be registered in the I/O-request cue if it is judged that the present time is behind the attenuation-end time instant. In the I/O request processing method of the fourth and sixth aspects of the present invention a configuration may be employed wherein the method further includes the steps: comparing a time interval of receiving the I/O requests from the external device against a threshold of the time interval stored in a time-interval specified-value storage section: storing in association with the external device an attenuation-end time instant at which a registry priority of the I/O request issued from the external device is lowered if it is judged that the time interval of receiving the I/O requests exceeds the threshold of the time interval. In this case, a configuration may be employed wherein the method further includes the steps of comparing the present time against the attenuation-end time instant, and determining that the received I/O request be registered in the I/O-request cue if it is judged that the present time is behind the attenuation-end time instant. In such a case, by setting the attenuation-end time instant for an external device having a longer time interval of issuing (interval of receiving) the I/O request, the I/O requests from other external devices can be registered by priority into the I/O-request cue. The attenuation-end time instant may be calculated by adding a specified time instant to the time instant at which the latest I/O request is registered in the I/O-request cue.

Although the present invention is described based on the preferred embodiments thereof, the I/O-request processing system of the present invention is not limited to the above embodiments and various modifications or alterations made from the above embodiments may fall within the scope of the present invention.

The invention claimed is:

1. An I/O-request processing system that registers an I/O request received from an external device into an I/O-request cue for controlling input/output of data performed between the external device and an input/output device based on I/O requests registered in the I/O-request cue, the I/O-request processing system comprising:

an I/O-request receiving section that receives an I/O request issued from an external device;

a priority-external-device judgment section that refers, upon receipt of an I/O request by the I/O-request receiving section, to an external-device-information storage section storing therein a continued-registry-failure time length for each device during which an I/O request issued from the each device is not registered in the I/O-request cue in succession and a continued-registry-failure specified-time-length storage section storing therein a specified time length for a continued-registry-failure time length, to determine whether or not the received I/O request is to be registered in the I/O-request cue; and an attenuation-time-instant setting section that compares a time interval of receiving the I/O requests from the external device against a threshold of the time interval stored in a time-interval specified-value storage section, to stores in association with the external device an attenuation-end time instant, at which a registry priority of the I/O request issued from the external device is lowered if it is judged that the time interval of receiving the I/O requests exceeds the threshold of the time interval.

2. The I/O-request processing system according to claim 1, wherein the continued-registry-failure specified-time-length storage section stores therein a threshold of the continued-registry-failure time length, and the priority-external-device judgment section registers the received I/O request into the I/O-request cue if the continued-registry-failure time length of the external device that issued the I/O request is equal to or larger than the threshold.

3. The I/O-request processing system according to claim 1, wherein the continued-registry-failure specified-time-length storage section stores therein a threshold of rank of the continued-registry-failure time length, and the priority-external-device judgment section registers the received I/O request into the I/O-request cue, if a rank of the external device that issued the I/O request is equal to or higher than the threshold of the rank of continued-registry-failure time length when the continued-registry-failure time lengths of the external devices are arranged in a descending order thereof.

4. The I/O-request processing system according to claim 1, wherein the I/O-request processing system returns information to the external device that issued the received I/O request, the information indicating a failure of the registry into the I/O-request cue, if the priority-external-device judgment section judges that the received I/O request is not registered into the I/O-request cue.

5. The I/O-request processing system according to claim 1, wherein the priority-external-device judgment section refers to an I/O-request-cue-information storage section that stores therein a used rate of the I/O-request cue and an I/O-request-cue specified-value storage section that stores therein a specified value for the used rate, to determine that the received I/O request be registered in the I/O-request cue if the used rate is smaller than the specified value.

6. The I/O-request processing system according to claim 1, wherein the priority-external-device judgment section compares the present time against the attenuation-end time instant, to determine that the received I/O request be registered in the I/O-request cue if it is judged that the present time is behind the attenuation-end time instant.

7. An I/O-request processing method for registering an I/O request received from an external device into an I/O-request cue for controlling input/output of data performed between the external device and an input/output device based on I/O requests registered in the I/O-request cue, the method comprising the steps of:

receiving an I/O request issued from an external device;

referring to an external-device-information storage section storing therein a continued-registry-failure time length for each device during which an I/O request issued from the each device is not registered in the I/O-request cue in succession and a continued-registry-failure specified-time-length storage section storing therein a specified time length for a continued-registry-failure time length, to determine whether or not the received I/O request is to be registered in the I/O-request cue;

comparing a time interval of receiving the I/O requests from the external device against a threshold of the time interval stored in a time-interval specified-value storage section; and storing in association with the external device an attenuation-end time instant, at which a registry priority of the I/O request issued from the external device is lowered if it is judged that the time interval of receiving the I/O requests exceeds the threshold of the time interval.

8. The I/O-request processing method according to claim 7, wherein the continued-registry-failure specified-time-length storage section stores therein a threshold of the continued-registry-failure time length, and the step of determining whether or not to be registered registers the received I/O request into the I/O-request cue if the continued-registry-failure time length of the external device that issued the I/O request is equal to or larger than the threshold.

9. The I/O-request processing method according to claim 7, wherein the continued-registry-failure specified-time-length storage section (551) stores therein a threshold of rank of the continued-registry-failure time length, and the step of determining whether or not to be registered the received I/O request into the I/O-request cue, if a rank of the external device that issued the I/O request is equal to or higher than the threshold of the rank of continued-registry-failure time length when the continued-registry-failure time lengths of the external devices are arranged in a descending order thereof.

10. The I/O-request processing method according to claim 7, further comprising the step of returning information to the external device that issued the received I/O request, the information indicating a failure of the registry into the I/O-request cue, if the step of determining whether or not to be registered judges that the received I/O request is not registered into the I/O-request cue.

11. The I/O-request processing method according to claim 7, further comprising the steps of:

referring to an I/O-request-cue-information storage section that stores therein a used rate of the I/O-request cue and an I/O-request-cue specified-value storage section that stores therein a specified value for the used rate, to compare the used rate against the specified value for the used rate; and registering the received I/O request into the I/O-request cue if the used rate is smaller than the specified value.

12. The I/O-request processing method according to claim 7, further comprising the steps of comparing the present time against the attenuation-end time instant, and determining that the received I/O request be registered in the I/O-request cue if it is judged that the present time is behind the attenuation-end time instant.

* * * * *